United States Patent [19]
Yamamoto et al.

[11] Patent Number: 6,075,648
[45] Date of Patent: Jun. 13, 2000

[54] PROJECTOR-TYPE DISPLAY DEVICE

[75] Inventors: Chikara Yamamoto, Urawa; Kazuya Yoneyama, Omiya, both of Japan

[73] Assignee: Fuji Photo Optical Co., Ltd., Omiya, Japan

[21] Appl. No.: 09/118,856

[22] Filed: Jul. 20, 1998

[30] Foreign Application Priority Data

Jul. 25, 1997 [JP] Japan ................................ 9-215872

[51] Int. Cl.[7] .............................................. G02B 27/10
[52] U.S. Cl. ............................ 359/619; 359/621; 353/20
[58] Field of Search .................... 359/621, 619; 353/20

[56] References Cited

U.S. PATENT DOCUMENTS

| | | | |
|---|---|---|---|
| 3,513,306 | 5/1970 | Vantine | 359/621 |
| 5,463,497 | 10/1995 | Muraki et al. | 359/618 |
| 5,748,374 | 5/1998 | Neijzen et al. | 359/621 |
| 5,826,959 | 10/1998 | Atsuchi | 353/20 |

FOREIGN PATENT DOCUMENTS

| | | |
|---|---|---|
| 3-111806 | 5/1991 | Japan . |
| 6-265887 | 9/1994 | Japan . |

*Primary Examiner*—Georgia Epps
*Assistant Examiner*—Tim Thompson
*Attorney, Agent, or Firm*—Arnold International; Bruce Y. Arnold

[57] ABSTRACT

In a projection-type display apparatus employing an integrator to make uniform the illumination provided at a pupil plane, in the case where the illumination is provided by a plurality of light source units, structure is provided to improve the image formed by a projection lens. This is accomplished by making the light output from the plurality of light source units appear, from the projection lens, as though the light source units lie closer to the optical axis than is actually the case. In this way, aberrations in the projected image are reduced, since the light which forms the projected image transits the pupil of the projection lens nearer the optical axis, where the image-formation quality of a lens is highest.

9 Claims, 8 Drawing Sheets

PROJECTOR-TYPE DISPLAY DEVICE

BACKGROUND OF THE INVENTION

An illumination method known as the relay condenser method, which is one type of Keller illumination method, is known in the prior art. This illumination method relays an image of a light source by forming an image of the light source near the pupil of a projection lens. The projection lens then forms an image of the light source (or, more accurately stated, of the relayed image of the light source) at infinity using a condenser lens to thereby make more uniform unevenness in illumination caused by unevenness in the luminosity of the light source. However, when a light source is used which has a wide variance in luminosity distribution (such as with a metal halide lamp, a xenon lamp or a halogen lamp), unevenness in illumination remains in the image of the relayed image, causing a problem.

In contrast, a method called the integrator method has been known which uses lenticular lens arrays to smooth-out unevenness in luminosity distribution properties of a light source, and various proposals have been made for using light beam dividing techniques therein, as in Japanese Laid-Open Patent Publication 3-111806.

This patent employs a concave reflector behind a light source and, in front of the light source, there are the following components: a collector lens, a first lenticular lens array, a second lenticular lens array, an image-forming lens, a field lens, and a projection lens. The first lenticular lens array comprises a plurality of lenses arranged in a two-dimensional array. The second lenticular lens array similarly is a two-dimensional array. The first lenticular lens array divides a light beam that has been emitted directly from a light source with great unevenness in brightness into divided light beams, the number of which equals the number of lenses in the first lenticular lens array. These divided light beams are then incident on, and transmitted by, the second lenticular lens array which composes the non-uniform light beams to form a more even illumination in the target illumination region. An image-forming lens and a field lens then project the combined light so as produce a more uniform beam than would exist if the light from the light source were projected without being made more uniform by the first and second lenticular lens arrays which serve as an integrator. Thus, light may be projected onto a target illumination region with less unevenness in brightness, as compared to if a single light beam were used.

In addition, in a projection-type display apparatus using two lenticular lens arrays as described above, it has been known that a plurality of light sources can be arranged having symmetry about an optical axis, with the aim of securing a stronger (i.e., more intense) illuminating light (see Japanese Laid-Open Patent Publication 6-265887).

In general, light from a light source having an intensity distribution that is not uniform is directed by a first reflector onto a first portion of a first lenticular lens array, as described above. Accordingly, particularly in the above-described case where a plurality of light sources are arranged symmetrically about an optical axis, areas with a large amount of illumination are created on a surface of the second lenticular lens array at positions separated predetermined distances from the optical axis. As the second lenticular lens array is positioned at the pupil plane of the projection lens, this results in areas of strong illumination at the pupil plane of the projection lens.

Furthermore, because the imaging quality of a lens is highest for locations on the optical axis and becomes lower with increasing distance from the optical axis, when areas with strong intensity, that is to say, areas which subjectively affect a viewed image the most, exist at positions off-axis in the pupil plane of the projection lens, the full potential of the image-formation capability of the projection lens cannot be exhibited.

BRIEF SUMMARY OF THE INVENTION

The present invention relates to a projection-type display device for enlarging and projecting onto a screen motion images displayed on a light modulator, and more precisely, relates to improving the structure of an integrator in order to make the illumination of the back-side of the light modulator uniform (i.e., even) while, at the same time, forming clearer images. This is accomplished by making at least one of the multiple light sources which illuminate the back-side of the modulator appear to be located nearer the optical axis, at the pupil plane of the projection lens, than in the prior art, thereby reducing aberrations imparted by the projection lens.

In consideration of the foregoing, an object of the present invention is to provide a projection-type display device which utilizes the highest possible image-formation capability of a projection lens, in the situation where the illuminating light is made more uniform by using an integrator using two lenticular lens arrays and stronger by employing a plurality of light sources. This is accomplished by causing at least one of the light sources to appear to lie nearer the optical axis, in the pupil plane of the projection lens, than it would otherwise.

BRIEF DESCRIPTION OF DRAWINGS

The present invention will become more fully understood from the detailed description given below and the accompanying drawings, which are given by way of illustration only and thus are not intended to limit the scope of the present invention, and wherein:

FIG. 3($b$) shows light spot positions on a second lenticular lens array of the illuminating apparatus shown in FIG. 1;

FIG. 4($b$) shows light spot positions on a second lenticular lens array of an illuminating apparatus according to the prior art;

DETAILED DESCRIPTION

Figure 1:
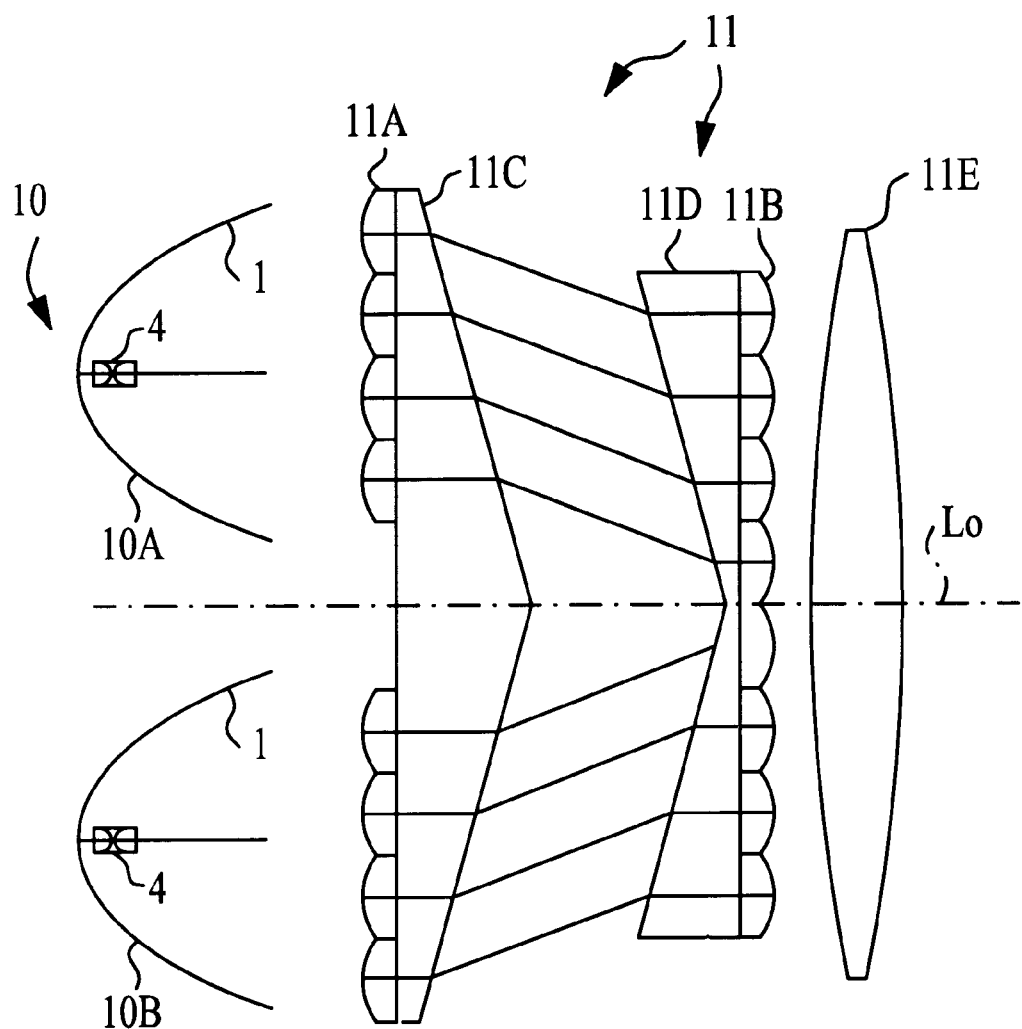
FIG. 1 is a side view of components of an illuminating apparatus, having four light sources (only two of which are visible) that are aligned in rows symmetrically about an optical axis, in a first embodiment of the present invention.

Referring to FIG. 1, the projection-type display device of the present invention includes an illuminating apparatus composed of multiple (e.g., four) light source units arranged symmetrically about an optical axis, Lo. Only two light source units 10A, 10B, are illustrated, with the other two light source units being not visible as a result of lying behind the illustrated units 10A, 10B. Each light source unit has a luminous body 4 and a reflector 1 for reflecting the light from the luminous body as a light beam directed toward a forward direction of the optical axis Lo, the light source units (in this Figure) being displaced from the optical axis Lo and arranged in a row normal thereto. The illuminating apparatus further includes an integrator 11, composed of two lenticular lens arrays positioned along the optical axis of the illuminating apparatus, which function to make the light from the light source units uniform (i.e., even) in a plane orthogonal to the optical axis of the illuminating apparatus. The illuminating apparatus further includes structure to reposition at least one light beam produced by the various light source units of the illuminating apparatus so that the beam lies nearer the optical axis of the integrator than when produced by the light source unit.

Figure 2:
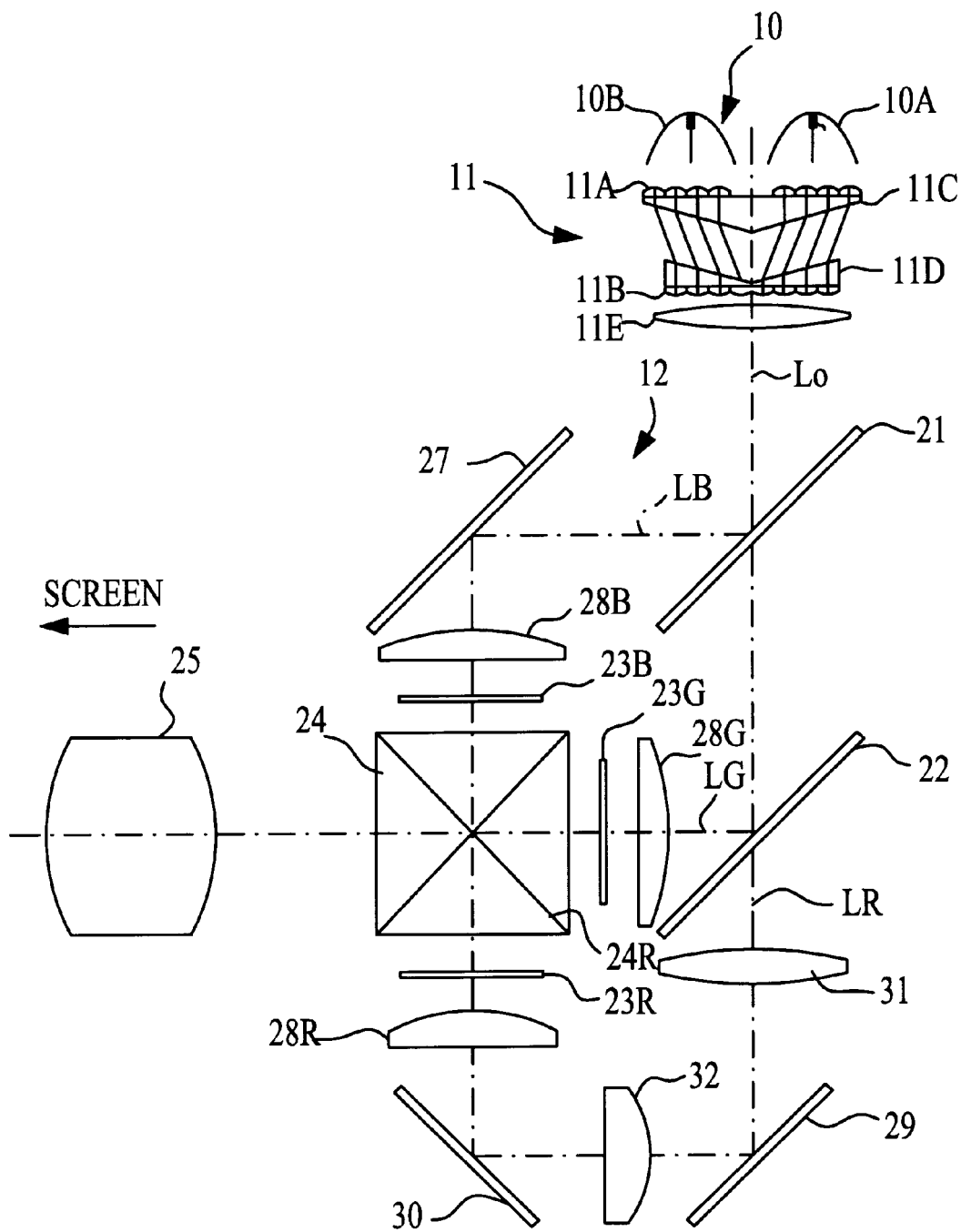
FIG. 2 shows the illuminating apparatus of FIG. 1 being used as part of a projection-type display device according to the first embodiment of the present invention.

Referring to FIG. 2, in addition to the illuminating apparatus as described above, the projection-type display of the present invention may include one or more light modulators, such as liquid crystal panels 23R, 23G, 23B, for modulating light output from the integrator 11 in accordance with predetermined data, and a projection lens 25 for projecting an optical image, formed from the light modulated by the light modulator(s), onto a screen (not illustrated).

The structure to reposition may include, for each dimension of repositioning, a set of prisms 11C,11D located sequentially along the optical axis, the first prism 11C for causing the light rays to approach the optical axis in a single dimension and the second prism 11D (of inverse shape) for causing the light rays to travel parallel to the optical axis. For clarity of illustration, only a single set of prisms is illustrated in the figures. Another set of prisms, oriented 90 degrees in azimuth to the first set, is required to cause the light rays to approach the optical axis in a direction normal to the plane of the drawing figure, as is required if the light sources are arranged in a two-dimensional array. Other, alternative, structures to reposition the light rays in two dimensions would be a four-sided pyramid to cause the light beams to approach the optical axis and an inverse pyramid to cause these beams to be refracted so as to again travel parallel to the optical axis. Or, fiber optic cables could be used to gather the light from the individual light source units and emit the light nearer the optical axis Lo in one or two dimensions than the actual positions of the light source units. It is also possible for the means to reposition the light beams to be structured such that a first lenticular lens array (i.e., the one positioned nearest the light source units) itself serves as the means to reposition the light beams and causes the light beams from the illuminating apparatus to approach the optical axis of the integrator, and such that a second lenticular lens array causes the light beams from the first lenticular lens array to be directed parallel to the optical axis of the integrator and in the forward direction. Further, the reflector may be a paraboloidal mirror or an ellipsoidal mirror.

Furthermore, if the reflector is a paraboloidal mirror, the integrator may be equipped with two prisms on the same side of the first lenticular lens array as the light source units. The prism nearest the light source units may cause the light rays from the illuminating apparatus to refract so as to approach the optical axis of the integrator while remaining approximately collimated (i.e, approximately parallel among themselves), and the remaining prism may refract the light rays so as to transit in the forward direction while remaining approximately collimated. In addition, the two prisms may be moveable relative to each other in the direction in which the optical axis of the integrator extends. Hereinafter, various embodiments of the present invention will be described in detail.

As shown in FIG. 2, the projection-type display apparatus of the first embodiment is composed of an integrator 11, for making the light flux distribution uniform by mixing the light beams emitted from an illuminating optical system 10, and a projection unit 12 for imparting image information to the light beams made uniform by the integrator 11 and for projecting this light onto a screen.

As shown in FIG. 1, the aforementioned illuminating optical system 10 comprises a luminous body 4 composed of a discharge tube such as a xenon lamp or metal halide lamp, and a plurality (four in the present embodiment) of light source units composed of reflectors 1 made up of paraboloidal mirrors and arranged symmetrically about the optical axis. Each reflector 1, when composed of a paraboloidal mirror as illustrated, has a luminous body 4 at the focal position of the respective paraboloidal mirror, and thus light rays emitted from the luminous body 4 and directed rearward and outward are reflected to form a light beam traveling substantially parallel to the optical axis.

The integrator 11 is provided with a first lenticular lens array 11A for forming multiple light beams from the beam from each reflector 1, a second lenticular lens array 11B for causing the light beams from the first lenticular lens array 11A to overlap on one or more liquid crystal panels of the projection unit 12 (described below), a first prism 11C positioned on the side of the first lenticular lens array 11A nearest the second lenticular lens array 11B and used in refracting the light output from the first lenticular lens array 11A so that this light approaches the optical axis Lo while remaining substantially collimated, a second prism 11D, of inverse shape to the first prism, and positioned on the side of the second lenticular lens array 11B nearest the first lenticular lens array 11A for refracting the light output from the prism 11C so that this light transits parallel to the optical axis Lo while remaining substantially collimated, and a convex field lens 11E.

As shown in FIG. 2, the projection unit 12 comprises a dichroic mirror 21 for dividing the light beams that have been made uniform by the integrator 11 into a blue component LB and a remainder component; a dichroic mirror 22 for dividing the remained component into a reflected green component LG and a transmitted red component LR, a liquid crystal panel 23B on which the image of the blue component LB is displayed; a liquid crystal panel 23G on which the image of the green component LG is displayed; a liquid crystal panel 23R on which the image of the red component LR is displayed; a three-color synthesizing prism 24 for combining the components LB, LG and LR of the light beams that have passed through the liquid crystal panels 23B, 23G and 23R and been imparted with image information; and a projection lens 25 for composing the light beams synthesized by the three color synthesizing prism into an image on a screen (not illustrated). In addition, the projection unit further comprises a reflective mirror 27 for reflecting the blue component LB toward the liquid crystal panel 23B, a field lens 28B for collimating the blue component LB; a field lens 28G for collimating the green component LG; reflective mirrors 29 and 30 for reflecting the red component transmitted by dichroic mirror 22 toward the liquid crystal panel 23R; and a field lens 28R for collimating the red component LR reflected by reflective mirror 30.

In the above-described projecting optical system the path length to reach the three-color synthesizing prism 24 is obviously the same for the blue component LB and the green component LG. In the case of the red component LR, the path length is longer. However, a field lens 31 is positioned between the dichroic mirror 22 and the reflective mirror 29, and a relay lens 32 is positioned between the reflective mirror 29 and the reflective mirror 30, and by means of this field lens 31 and relay lens 32, the apparent light source position of the red component LR is shortened so as to appear the same as that of the blue component LB and the green component LG.

In addition, the aforementioned three color synthesizing prism 24 is a cross prism, and has a dichroic surface 24B for reflecting the blue component LB and a dichroic surface 24R for reflecting the red component LR.

When the illuminating optical system 10 is composed of a plurality of light source units arranged symmetrically about the optical axis at one or more positions separated from the optical axis, there are corresponding areas on the second lenticular lens array 11B with strong intensity, and one or more of these will likewise be separated from the optical axis Lo. However, the image-formation capability of the projection lens 25 is highest for positions located on the optical axis and becomes lower for positions located farther away from the optical axis. Thus, when there is an area of strong intensity at a position separated from the optical axis Lo, and positioned in the pupil plane of the projection lens 25, it is impossible to realize the full imaging potential of projection lens 25, due to aberrations of the lens which occur and which increase with distance from the optical axis.

In the present embodiment, the above-described two prisms 11C and 11D are arranged between the two lenticular lens arrays 11A and 11B, so that the light beams output from the first lenticular lens array 1A are refracted toward the optical axis Lo while remaining substantially collimated, and the areas of strong intensity due to the light source units are made to appear nearer to the optical axis Lo at the pupil plane of the projection lens 25.

Figure 3B:
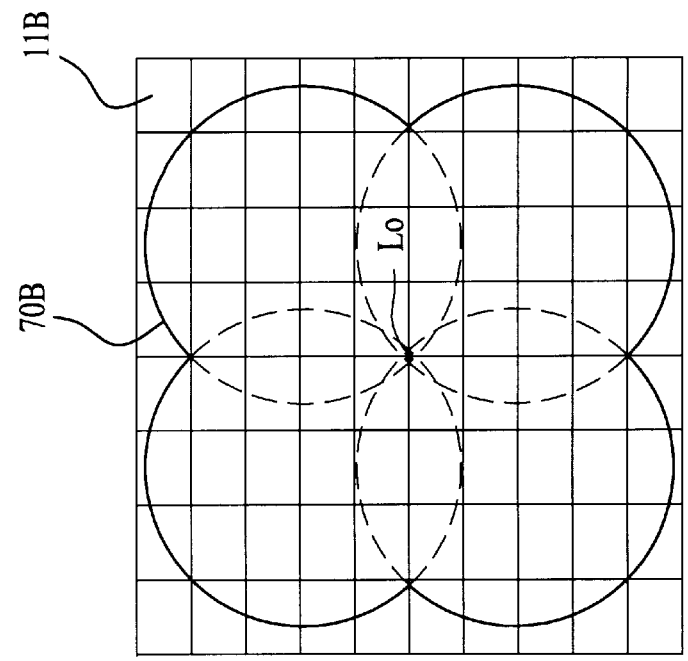
FIG. 3($a$) shows light spot positions on a first lenticular lens array (the one located nearest the light sources) of the illuminating apparatus shown in FIG. 1.
Figure 3A:
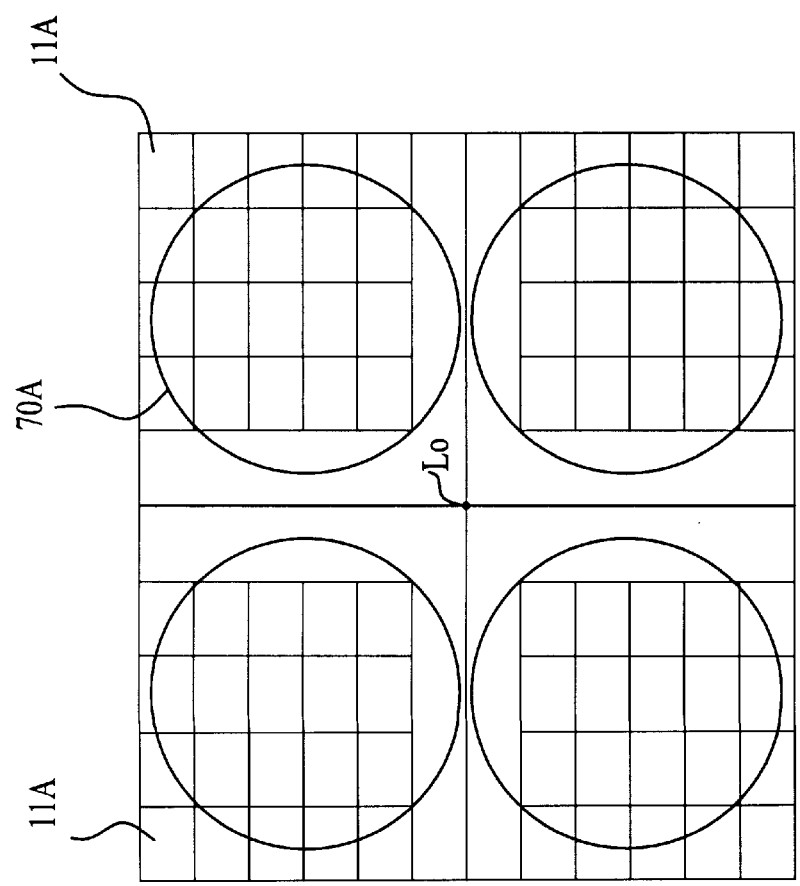

Referring to FIG. 3(a), in a case where the illuminating optical system 10 comprises four light source units arranged symmetrically about the optical axis, the four light spots 70A from each of the light source units on the first lenticular lens array 11A are each positioned at predetermined positions that are separated from the optical axis Lo. Following this, the light beams forming the light spots 70A are repositioned (as collimated beams) toward the optical axis Lo by the above-described prisms 11C and 11D so that, as shown in FIG. 3(b), each light spot 70B on the second lenticular lens array is formed at a position nearer the optical axes Lo than in FIG. 3(a). Further, portions of the light spots on the second lenticular lens array 11B may be made to mutually overlap, as illustrated.

Comparing the above-described lenticular lens arrays 11A and 11B, the lenses in the first lenticular lens array 11A (FIG. 3(a)) are positioned at the four outer corners of the lens array 11, with there being no lenses in a central, cross-shaped region. In the second lenticular lens array 11B (FIG. 3(b)), there is no such central, cross-shaped region without lenses. Further, the light rays from each light source unit transit in collimated fashion from the position of each light spot 70A on the first lenticular lens array 11A to the position of each light spot 70B on the second lenticular lens array 11B without the diameter of the light beam changing.

Figures 4A, 4B:
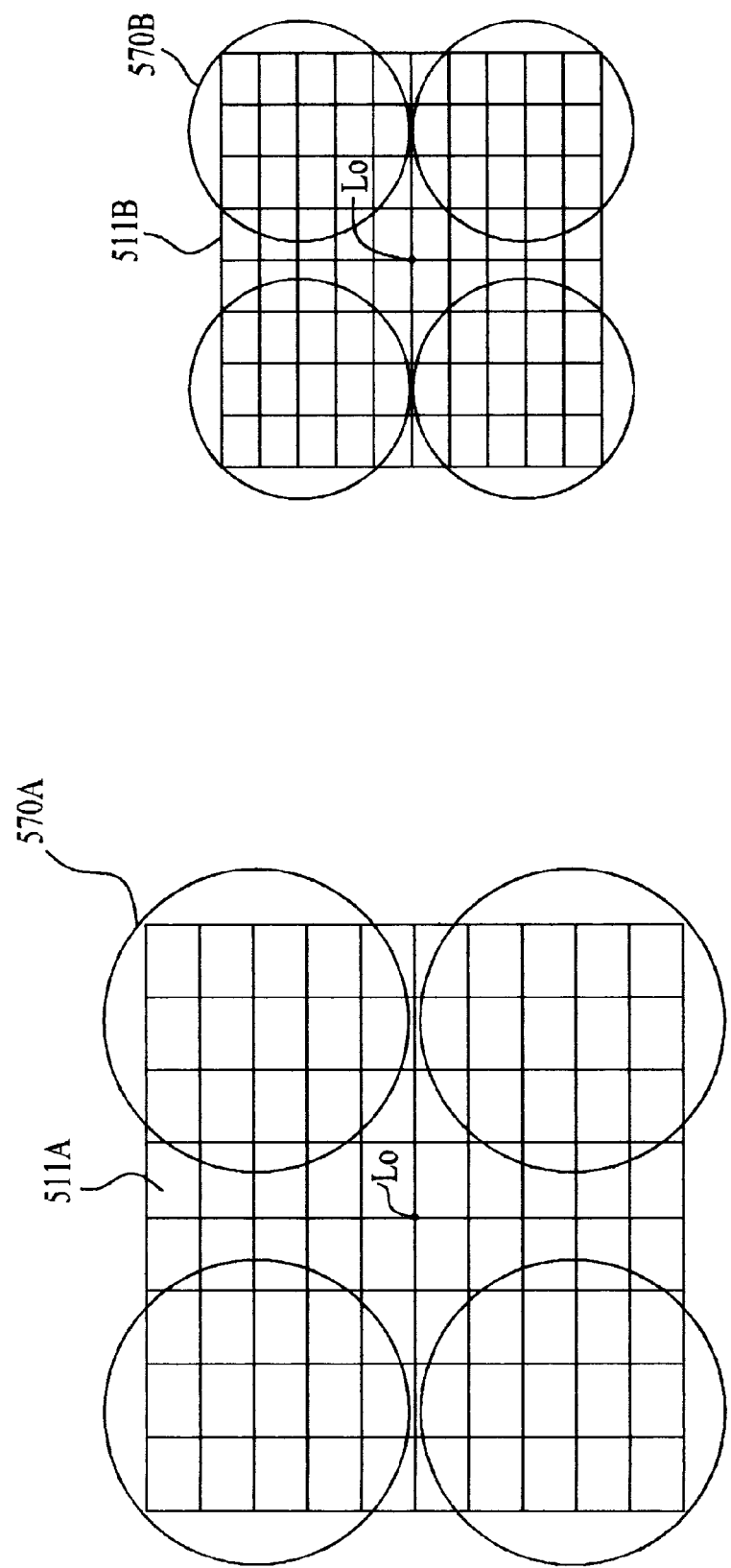
FIG. 4($a$) shows light spot positions on a first lenticular lens array of an illuminating apparatus according to the prior art.

This movement of the light beams created by each of the light source units in transiting from the first lenticular lens array 11A to the second lenticular lens array 11B is completely different from that of the light beams in the conventional technology described in the aforementioned publication (Japanese Laid-Open Patent Publication 6-265887). That is to say, in the technology described in this publication, as shown in FIG. 4(a), the diameter of each light spot 570A on the first lenticular lens array 511A is proportionally shrunk to form each smaller light spot 570B on the second lenticular lens array 511B, and the ratio of change in diameter from each light spot 570A on the first lenticular lens array 511A to each light spot 570B on the second lenticular lens array 511B matches the ratio of the change in diameter of each lens of the first lenticular lens array 511A to the diameter of each lens of the second lenticular lens array 511B.

Accordingly, in comparison to the position of each light spot 570A on the first lenticular lens array 511A, the position of each light spot 570B on the second lenticular lens array 511B may at first appear to be relatively closer (in relation to the light spot diameter) to the optical axis Lo at first glance, but the size of each lens of the two lenticular lens arrays 511A and 511B and the size of each light spot 570A and 570B have also proportionally shrunk, so in reality the light spots are not closer to the optical axis Lo, relative to the light spot diameter 570B.

In contrast to this, in the present embodiment the size of each lens of the lenticular lens arrays 11A and 11B and the size of each light spot are the same, so it is actually possible for the areas with strong intensity to be positioned nearer the optical axis Lo, relative to the light spot diameter. Thus, it is possible to reposition the areas of strong intensity so as to be nearer the optical axis at the pupil plane of the projection lens 25, and to thereby improve the quality of the image formed by the projection lens 25.

The above-described integrator 11 is comprised such that the light beams from each light source unit approach the optical axis while remaining substantially collimated. Of course variations in structure are possible. For example, other embodiments of the integrator are illustrated in FIGS. 5 and 6.

Figure 5:
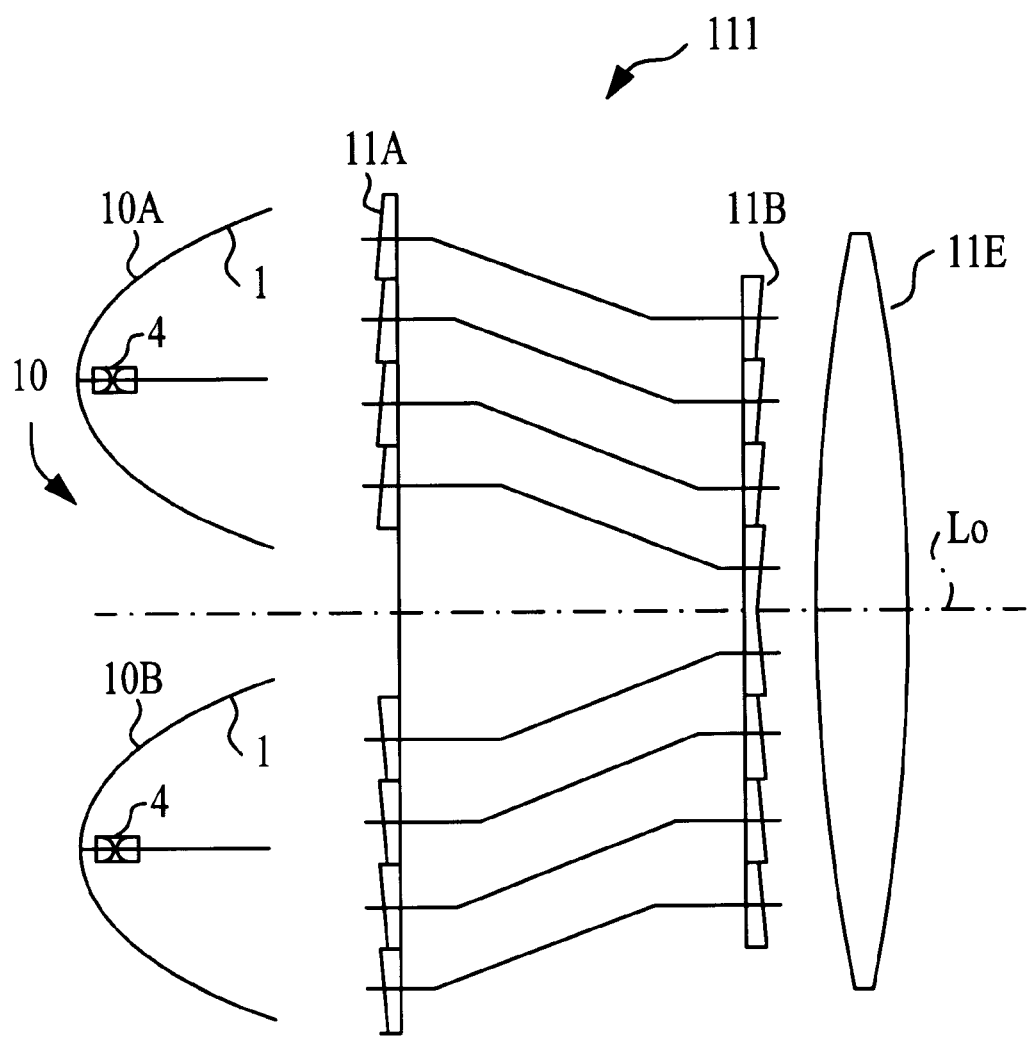
FIG. 5 is a side view of components of an illuminating apparatus, having four light sources (only two of which are visible) that are aligned in rows symmetrically about an optical axis, in a second embodiment of the present invention.

As shown in FIG. 5, the integrator 111 has each lens of the lenticular lens arrays 111A and 111B itself formed with a wedge-shaped prism configuration. As in the embodiment shown in FIG. 1, each light spot is formed on the second lenticular lens array 111B so as to approach the optical axis Lo without the diameter of each light spot on the first lenticular lens array 111A being changed.

Thus, in the embodiment shown in FIG. 5, the same effect as with the embodiment shown in FIG. 1 is obtained but with a reduction in the number of optical components that are required.

Figure 6:
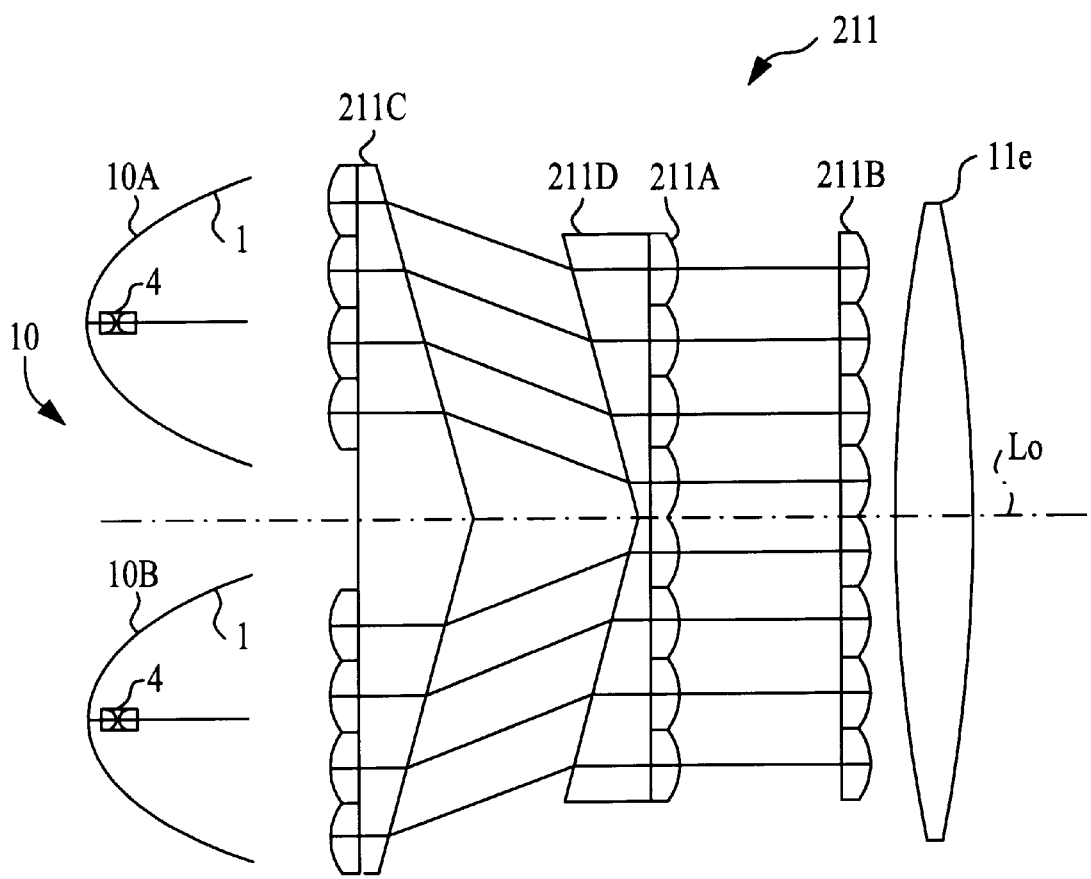
FIG. 6 is a side view of components of an illuminating apparatus, having four light sources (only two of which are visible) that are aligned in rows symmetrically about an optical axis, in a third embodiment of the present invention.

As shown in FIG. 6, the integrator 211 is such that the light beams from each of the light source units are made to approach the optical axis Lo while remaining substantially collimated. This is accomplished by using a first prism 211C and the second prism 211D (of inverse shape to the first prism) arranged between the illuminating optical system 10 and the first lenticular lens array 211A so that, unlike in the above-described embodiments shown in FIG. 1 and FIG. 5, each of the light beams already lies near the optical axis Lo when incident onto the first lenticular lens array 211A. Consequently, the light beams travel parallel to the optical axis Lo between the first lenticular lens array 211A and the second lenticular lens array 211B. In addition, in this situation, the overall array size of the each lenticular lens array is the same, and the size of each individual lens is the same for both lenticular lens arrays.

In addition, in the embodiment shown in FIG. 6, the first prism 211C and the second prism 211D are made to be moveable relative to one another in the direction in which the optical axis Lo extends, so that the degree to which the light beams from each of the light source units approach the optical axis Lo can be adjusted. Thus, the longer the distance between the two prisms 211C and 211D, the nearer the light beams approach the optical axis Lo.

In addition, in each of the above-described embodiments, the number of light source units of the illuminating optical system 10 was assumed to be four, but for the projection-type display apparatus of the present invention, this is intended to be illustrative only and not limiting, for an arbitrary number not less than two can be selected.

Figure 7B:
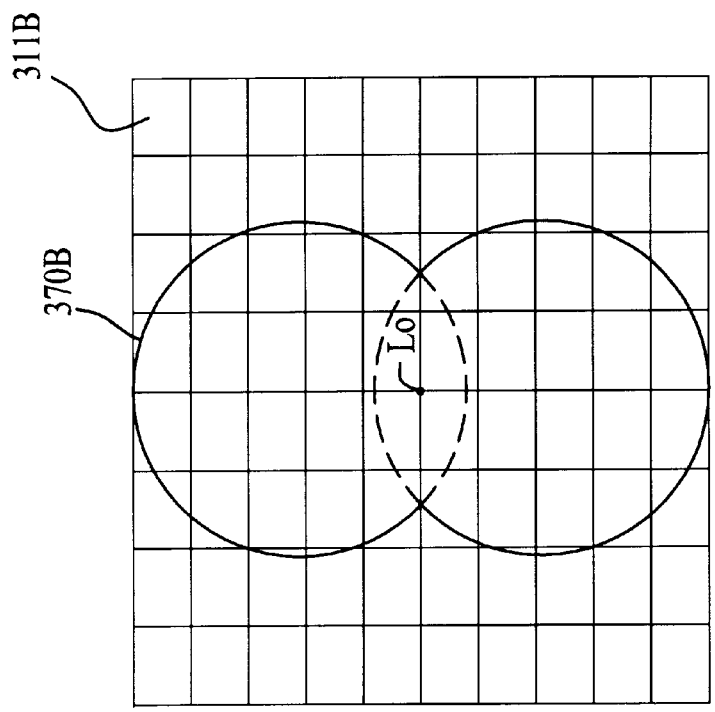
FIG. 7(b) shows light spot positions on a second lenticular lens array in the case where the lights is incident on the first lenticular lens as shown in FIG. 7(a).
Figure 7A:
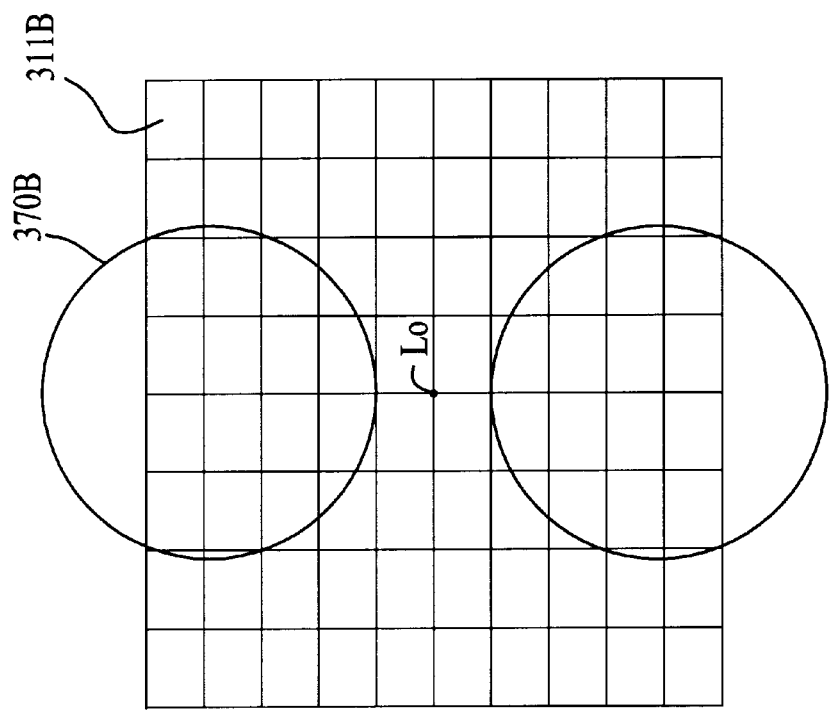
FIG. 7($a$) shows light spot positions on a first lenticular lens array in a case where only two light source units are used.

FIGS. 7(a) and 7(b) illustrate the situation when only two light source units and either of the integrator 11 of FIG. 1 or the integrator 111 of FIG. 5 is used. Thus, it is possible to compose the apparatus so as to make light spots 370A (FIG. 7(a)) on the first lenticular lens array mutually approach the optical axis Lo to form light spots 370B (FIG. 7(b)) on the second lenticular lens array. And, it is also possible to compose the apparatus so as to make light spots 470A (see FIG. 8(a)) on the first lenticular lens array (created by light beams from nine light source units) mutually approach the optical axis Lo to form light spots 470B (see FIG. 8(b)) on the second lenticular lens array. Again, the second lenticular lens array is located at a pupil plane of the projection lens.

Figure 8B:
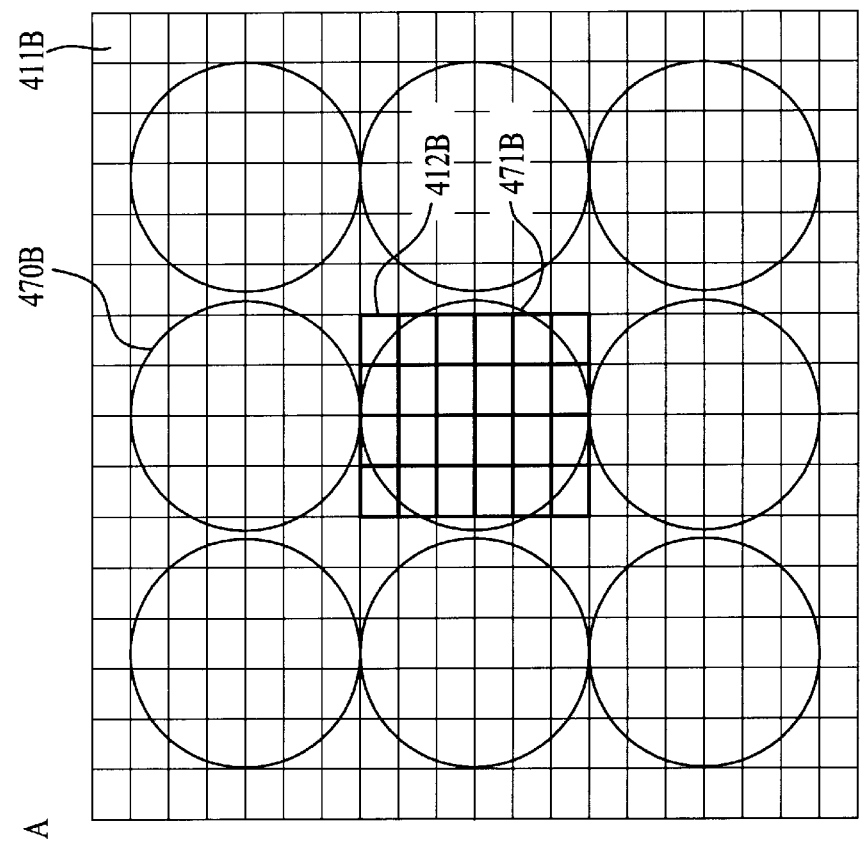
FIG. 8(a) shows light spot positions on a first lenticular lens array in a case where nine light source units are used, with one light source positioned on-axis; and, FIG. 8(b) shows light spot positions on a second lenticular lens array in the case where the light is incident on the first lenticular lens as shown in FIG. 8(a).
Figure 8A:
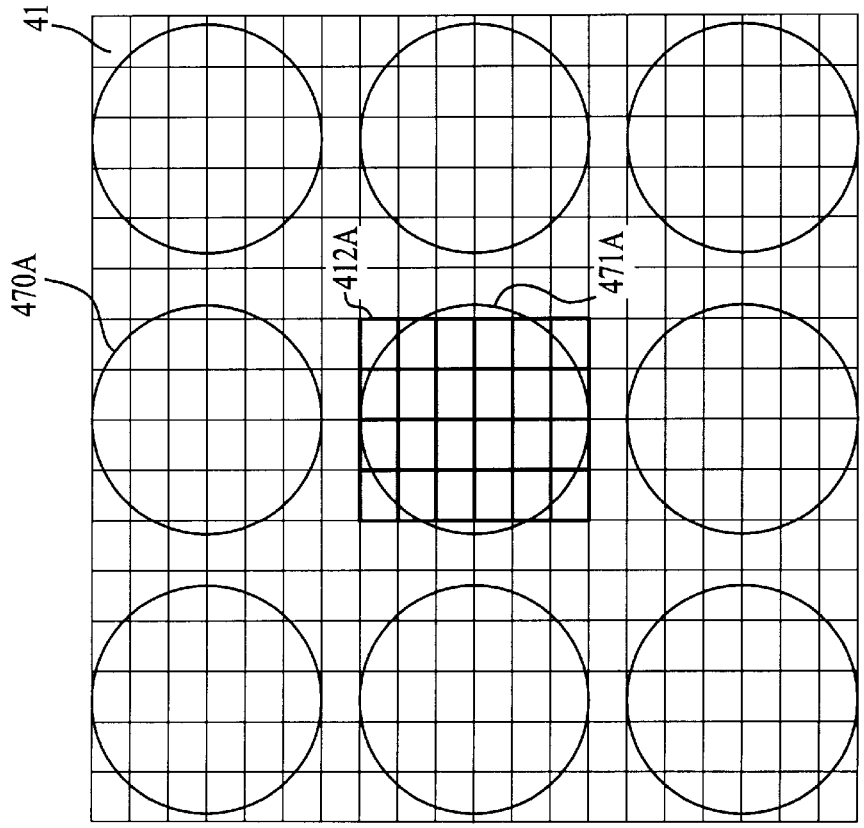
Figure 6:
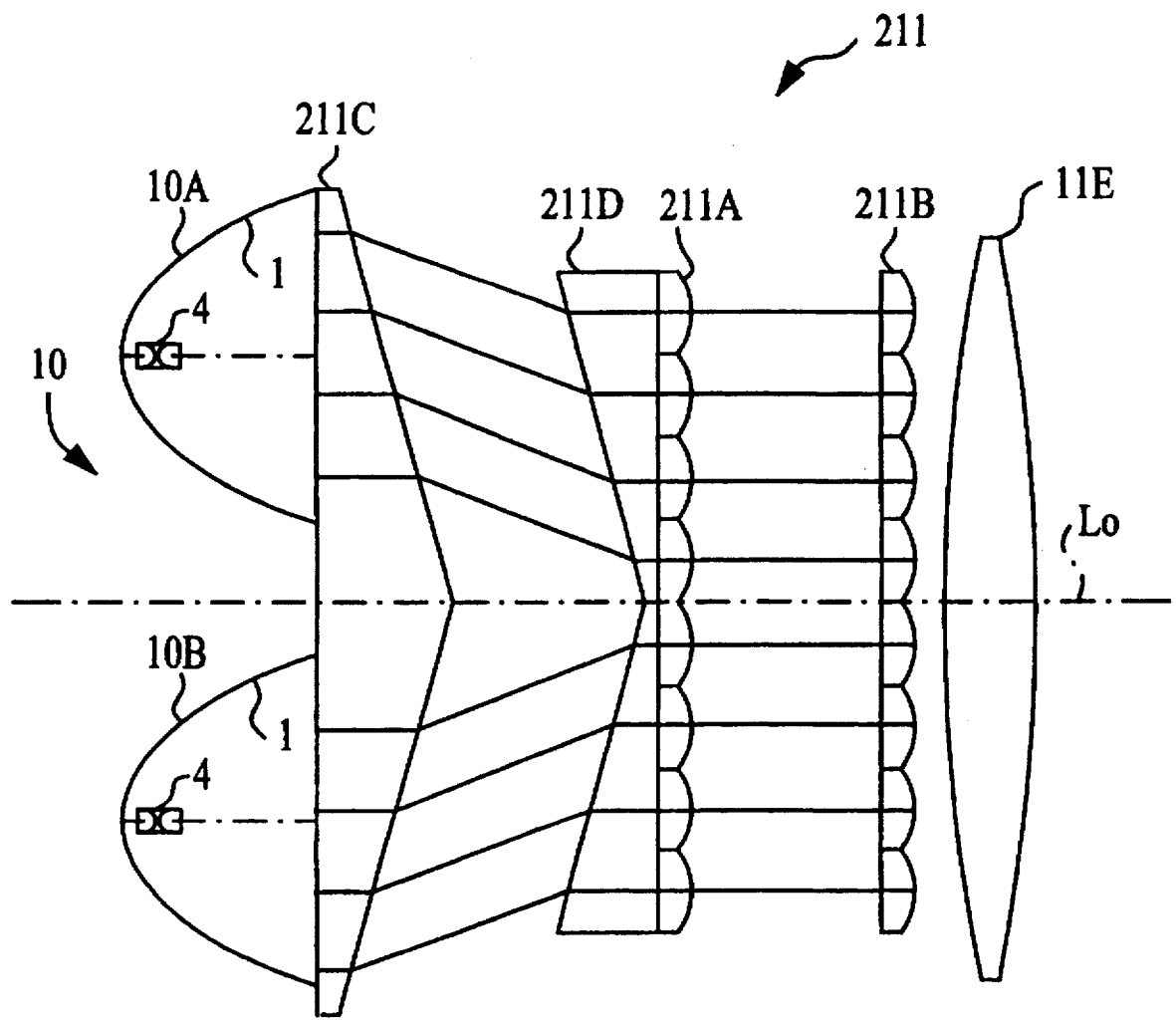

Also, as shown in FIGS. 8(a) and 8(b), the positions of light spots 471A and 471B, formed using an on-axis light source unit, do not need to be repositioned between the two lenticular lens arrays. Consequently, in the region corresponding to lenses 412A and 412B (drawn using bold lines in FIGS. 8(a) and 8(b)) no structure for making the light beams approach the optical axis and then travel parallel with the optical axis, as described for earlier figures, need be provided.

It should be noted that, where the light rays travel parallel to the optical axis between the first lenticular lens array and the second lenticular lens array, as is the case in FIG. 6, the lenticular lens array 311B (FIG. 7(b)), and lenticular lens array 411(b), (FIG. 8(b)) illustrate the position of the light spots on the first and second lenticular lens arrays. In this situation, FIG. 7(a) and FIG. 8(a) illustrate the light source positions on the first lenticular lens array if the means to reposition the light beams were not used. However, for the embodiment shown in FIG. 6, it makes no difference if the composition of the first lenticular lens array is such that the light beam diameter is proportionally reduced when transiting between the two lenticular lens arrays.

In addition, in the above-described embodiments, paraboloidal mirrors are used as the reflectors of each of the light source units, but for the projection-type display apparatus of the present invention, this is intended to be illustrative and not limiting, for it is generally possible to use other curved mirrors such as ellipsoidal mirrors or the like so long as the integrator unit is composed so that the light beams approach the optical axis of the integrator while the ratio of change in the distance from the center of the light beams to the optical axis is at least as large as the ratio of change in the diameter of the light beams in transiting the integrator. However, in the embodiment shown in FIG. 6, it is necessary to use a paraboloidal mirror as the reflector.

The projection-type display apparatus of the present invention is not limited to the above-described embodiments, for numerous variations are possible. For example, the embodiments described above project the light after a dividing and synthesizing process are accomplished. However, it is possible to apply the present invention to apparatuses for projecting images in which the fight is first projected and then the dividing processes and light synthesizing processes are carried out.

As described above, the light beam from at least one of multiple light source units of an illuminating apparatus is repositioned so as to approach the optical axis of the integrator and so that the ratio of change, in the distance from the center of the light beam to the optical axis, is at least as great as the ratio of change in the size or diameter of the light beam as the light beam transits the integrator. The conditional phrase "so that the ratio of change, in the distance from the center of the light beam to the optical axis, is at least as great as the ratio of change in the size or diameter of the light beam as the light beam transits the integrator" is satisfied where there is a decrease in distance from the center of the light beam to the optical axis and no change in the size or diameter of the light beam as it transits the integrator. This enables, at the pupil plane of the projection lens, the light spot from at least one of the respective aforementioned light source units to be formed nearer the optical axis than in the prior art. Consequently, by such a technique, it is possible to improve the image that is formed by a projection lens.

What is claimed is:

1. An apparatus comprising:

an illuminator including a plurality of light source units, each light source unit having a luminous body and a reflector for reflecting light from the luminous body so as to form a component light beam, said plurality of light source units being arranged in a row so as to form a plurality of component light beams; and an integrator composed of at least two lenticular lens arrays arranged along an optical axis that is transverse to said row, said integrator receiving incident light from each of the plurality of component light beams and forming an output, said integrator functioning to make the output more uniform than the light incident on said integrator from each of the plurality of component light beams; and, means to reposition a fight beam from at least one of the light source units so that, without the affect of the integrator, the light beam appears to originate from a light source unit that is positioned nearer the optical axis than the actual light source unit which produced the light of said light bean;

wherein said reflector is rotationally symmetric so as to produce a beam having a diameter, and wherein a first ratio is greater than a second ratio, with said first ratio being determined by having its numerator correspond to a distance, off-axis, of a given light source unit, and its denominator correspond to the distance, off-axis, of the corresponding repositioned light beam from said light source unit, and the second ratio is determined by having its numerator correspond to the diameter of the component light beam from the given light source unit and its denominator correspond to the diameter of the corresponding repositioned light beam.

2. The apparatus according to claim 1, and further including:

a light modulator, for modulating the light output from the integrator in accordance with input data; and, a projection lens, for forming an image using the light from the modulator and for projecting the image onto a screen.

3. The apparatus according to claim 2, wherein said means to reposition forms part of said integrator.

4. The apparatus according to claim 3, said means to reposition comprising: a first prism for causing fight from said illuminating unit to be refracted so as to approach the optical axis of said integrator, and a second prism for causing fight from said first prism to be refracted so as to be directed parallel to said optical axis.

5. The apparatus according to claim 4, said first prism being attached to, or integral with, said first lenticular lens array, and said second prism being attached to, or integral with, said second lenticular lens array.

6. The projection-type display apparatus as defined in claim 1, wherein said reflector is a paraboloidal mirror or an ellipsoidal mirror.

7. The projection-type display apparatus as defined in claim 4, wherein at least one of the first prism and the second prism are moveable in the direction in which the optical axis of said integrator extends.

8. A method of reducing aberrations in a projected image, formed using multiple light source units, with at least one such light source unit being located off the optical axis of a lens used to project the image, said method comprising the following steps:

employing the multiple light source units to project light onto a light modulator via a light integrator; and repositioning the light from at least one of the multiple light source units that lies off-axis so as to transit closer to the optical axis at a pupil plane of the lens so that the ratio of change, in the distance from the center of the light beam to the optical axis, is greater than the ratio of change in the size or diameter of the light beam as the light beam transits the integrator.

9. The apparatus of claim 1, wherein the means to reposition a light beam is formed of at least two prisms, one of which causes the light from a light source unit to approach the optical axis, and the other of which causes the light from said light source unit that is refracted by the first prism to again be refracted, to thereby reposition the light beam from said light source unit so as to lie nearer the optical axis than when produced by said off-axis light source unit.

* * * * *

UNITED STATES PATENT AND TRADEMARK OFFICE
CERTIFICATE OF CORRECTION

PATENT NO. : 6,075,648
DATED : June 13, 2000
INVENTOR(S) : Yamamoto et al.

Page 1 of 2

It is certified that error appears in the above-identified patent and that said Letters Patent is hereby corrected as shown below:

Column 3,
Line 2, "lights" should be --light--

Column 8,
Line 18 and 58, "fight" should be --light--

Column 9,
Line 5, "fight" should be --light--.

Replace Fig. 6 as issued using the following Fig. 6.

Signed and Sealed this

Fourteenth Day of August, 2001

*Attest:*

Nicholas P. Godici

*Attesting Officer*

NICHOLAS P. GODICI
*Acting Director of the United States Patent and Trademark Office*